Sept. 2, 1941.          H. ROSENTHAL          2,254,245
METHOD AND PRODUCT OF COTTONSEED EXTRACTION
Filed Aug. 4, 1934          2 Sheets-Sheet 2

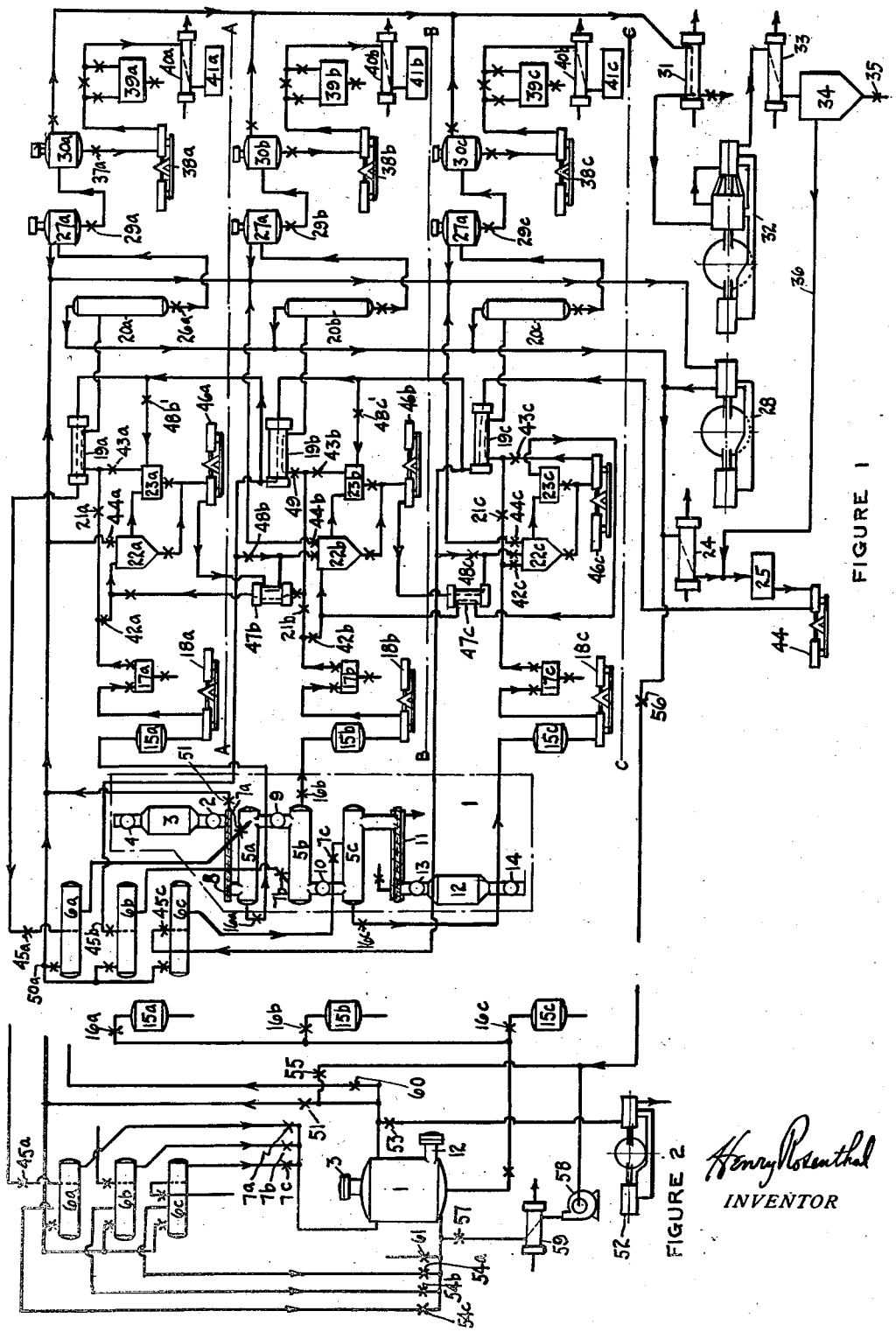

Henry Rosenthal
INVENTOR

Patented Sept. 2, 1941

2,254,245

UNITED STATES PATENT OFFICE 2,254,245

METHOD AND PRODUCT OF COTTONSEED EXTRACTION

Henry Rosenthal, New York, N. Y.

Application August 4, 1934, Serial No. 738,402

16 Claims. (Cl. 260—398)

My invention relates to a novel product of cottonseed and to a novel process of and apparatus for the extraction of oil from cottonseed. It is particularly related to the extraction of this novel oil by a novel application in the liquid phase of low boiling hydrocarbons such as butane, propane, propylene and similar materials as solvent.

While it is not new to use the low boiling hydrocarbons as solvent for the extraction of oleaginous materials, I have found that by my present invention, I can procure new and novel results and I can thus secure extraction products which so far as I am aware, are new and which I claim broadly, irrespective of the method of production.

I have found that the various solvents for cottonseed oil have different solvent actions in respect to the impurities such as the coloring matter and to the oil contained in the cottonseed. The lower members of the series of hydrocarbons have greater preferential solvent action than do the higher members of the series and a lighter colored oil can be extracted using the lower boiling hydrocarbons than when analogous upper members of the same series are used. This preferential solvent action becomes more pronounced as the temperature of extraction is reduced.

I have further found that the color of the finished oil is dependent not only upon the actual step of extraction but also upon the treatment of the solution in removing the solvent from the extract. The coloring matter in the remaining finished oil, separated from the solvent, in part is due to the setting of the color which may be present during the step of solvent removal and which may be associated with the solution either dissolved in the solution or present as finely divided material suspended in the solution. I have discovered that the setting of this color is enhanced by subjecting the solution to elevated temperatures. I have further found that when these temperatures are above certain levels, even heating for short periods will act to bring out the color of the impurities associated with the oil, while, if the solvent is separated at sufficiently low temperatures, the solution may be subjected to comparatively protracted heating without substantial deterioration of the oil obtained after removing solvent from the solution. Thus I have found that on removing solvent from the solution crude oil in which the color was 70 yellow and 24 red was darkened to a color of 70 yellow, 54 red when maintained to 240° F. for 1 hour.

I have further found that the quality of the oil produced is considerably affected by the amount of suspended matter present. I therefore remove the suspended matter in the solution prior to removing the solvent from the extract by passing the solution through a fine filter.

I have further found that when low boiling point hydrocarbons are used in the extraction, the high melting point components of the oil are preferentially dissolved if the temperatures are maintained from —5° F. to —15° F. Under these conditions substantially all of the "Cottonseed Stearine" is retained in the meats and where the meats are freshly prepared from prime or choice seeds, the amount of coloring matter passing in the solution is reduced to a comparatively small amount.

While it would seem that either butane or propane or similar materials, which are gaseous under normal conditions of temperature and pressure, should be easily substantially entirely eliminated from the solution obtained when cottonseed meats are treated with these solvents in the liquid phase, such is not the case. The solvent action of these materials depends upon the mutual solubility of the oil and the solvents, and this mutual solubility acts to retain minute portions of the solvent in the solution under conditions of temperature and pressure at which the solvent would be entirely vaporized in its pure stage, thus producing an off flavored oil.

In order therefore to separate the solvent from the solution, special means must be resorted to, in order to avoid temperatures which would be deleterious to the oil, if the solvent in the extract is to be reduced to an amount which will permit the extract to be ultimately used for edible purposes.

In accordance with my invention, where freshly prepared meats from choice of prime seed is extracted using low boiling hydrocarbon in the liquid phase as extracting media, at temperatures below —5° F. and —15° F., a crude cottonseed oil is obtained which when refined according to present rules governing transactions between members of the National Cottonseed Products Association, may be classified as a "winter" oil, that is it will remain clear and limpid when maintained in a 4 ounce oil sample bottle for 5 hours at 32° F. If the temperature of extraction is about —5° F. to +10° F., small portions of the "stearine" will pass into solution, but the oil obtained from the solution will be suitable for use as a salad or mayonnaise oil without subjecting it to a further step of "winterizing." When the low temperatures described above are used during the extraction, I prefer that the material to be extracted be chilled to temperatures approaching the extraction temperature, prior to subjecting them into the liquid solvent. Thus where the temperature of the extracting is below —5° F., I prefer that the meats be first chilled to a temperature not exceeding 20° F.; and where a temperature of 10° F. or lower is used during the extraction, that the temperature of the material to be extracted does not exceed 30° F. I further prefer that the liquid solvent be admitted to the extractor at substantially the same or at a somewhat lower temperature than that at which the extraction is conducted.

If the solution prepared as above is properly treated for removal of solvent at temperatures below 210° F. but preferably below 200° F. and the extract obtained is filtered before it is devolatilized, the refined oil will be a white oil, that is, it will have a color of 20 yellow and 2.5 red or lighter. In certain cases, the color reached on refining, using the present official method, may have slightly more red color than 2.5, and would therefore not be a white oil if the crude oil were refined by the official method. However, refinery practice is not limited to the refining method covered by the rules governing the classification of crude cottonseed oils and in many cases, by refining with lye somewhat stronger than that specified in the present rules, a refined oil having a color of 2.5 red or lighter will be produced, where the same crude oil if refined by the official method would have the color slightly in excess of this. It should be pointed out that a white oil which is produced directly from the crude by refining, and without bleaching, is superior to a bleached oil in that the color of such directly produced white oil is more permanently white than that of the bleached oil and that it will have no flavor of fuller's earth as is generally associated with the bleached oil.

However, in order that the extract and the finished oil be free from objectionable quantities of solvent, the solvent must be removed at reduced vapor pressures if temperature limits are not to be exceeded. This requires the use of either open steam or vacuum or both, as a final step in the solvent removal process. In order that the solvent may be efficiently recovered from the solvent removal step, it is further necessary, that the initial portion of this process be carried on at super atmospheric pressure.

Where sufficient open steam is used in the final devolatilization of the solution, the oil may be classified as a deodorized oil, and will require no further steps than caustic refining to make it fit for human consumption. Also where the extraction has been properly conducted at temperatures below 200° F. the oil after refining by the usual method will be a deodorized "winter" white oil or a "salad" oil. Where the steaming for the final solvent removal is conducted at atmospheric pressure for a sufficient period to produce a deodorized oil, the oil produced will not refine to a "white" color, but instead will be a yellow oil after refining, that is, its color on the Lovibond scale will be 35 yellow, 7.6 red or lighter.

Where extractor temperatures are appreciably in excess of +5° F., the stearine contained in the solution will exceed that which will permit the oil obtained from being classified as a "winter" oil or a salad oil without winterizing. However, I can conduct the extraction at any temperatures and by treatment of the solution prior to the separation of the solvent from the extract, I obtain a "winterized" oil after the solvent separation step. Where the solution contains appreciable amounts of "stearine" by reducing the temperature of the solution sufficiently, the stearine contained therein will be largely precipitated and may be separated from the solution prior to the separation of the solvent from the extract. The temperature at which the stearine will be precipitated from the solution depends to a considerable extent upon the concentration of the solution. With the concentration of solution obtained when sufficient solvent is applied to the cottonseed meats to secure efficient removal of the oil from the meal, the temperature required for precipitating stearine from the solution will be substantially the same as those recited for the fractional elimination of stearine during the extraction proper. If the solution is reduced below these temperatures but is maintained above temperatures at which the low melting point components of the oil also are largely precipitated, a "winterized" oil may be obtained from the liquid solution separated from the precipitate which will not be a pure oil but will be a concentrated solid solution of the higher melting oil components and the solvent. The color of the oil refined from the crudes so produced will depend upon the extraction temperatures, but except for a "white" oil without bleaching, the grades previously recited can be made by the use of my invention, even when the temperatures within the extractor are sufficiently high as to produce a single solution containing substantially all of the "stearine".

Where no attempt is made to obtain an oil with a low "stearine" content, but where the separation of the solvent from the extract is so conduced as to deodorize it, it will, upon refining with caustic, be a cooking oil fit for human consumption.

I have further found that where the meats are of good quality, where the temperatures at which the extraction is conducted are properly controlled, where the solution so obtained is properly filtered where the solvent then is properly separated from the extract, where the crude oil so secured is refined according to the present rules of the National Cottonseed Products Association, and the refined oil obtained in this manner is bleached with 6% fuller's earth by the procedure specified in the present rules of the National Cottonseed Products Association, the bleached oil so obtained will have a color lighter than 10 yellow and 1.5 red. As an example, I have treated prime fresh cottonseed meats with liquid propane at a temperature of about 65° F., filtered the solution thus obtained, separated the solvent from the extract at a temperature of 190° F. and at a vacuum of 27½". I have then filtered the extract and obtained a crude oil which refined into a prime "summer" oil of prime flavor and color of 35 yellow, 3.5 red with refining loss of 3.3% using 7.7% of 12° Bé. caustic. When this refined oil was bleached with 6% fuller's earth by the official method, it produced an oil having a color of 10 yellow, .9 red. As a further example, an extraction conducted using liquid butane as a solvent at a temperature below 66° F., produced a crude oil which after refining and bleaching with 6% fuller's earth by the official method produced a bleached oil having a color of 10 yellow and 1.1 red. In order to produce such light bleached oil, the temperature of extraction is preferably maintained below 80° F., using proper precautions in separating the solvent from the extract in the solution thus obtained.

I, prefer in most cases, to conduct my invention using, as the raw material, cottonseed meats separated from the hulls and lint of the cottonseed, in the manner usually employed in the preparation of cottonseed for pressing. These meats, separated from the hulls and lint, are then properly rolled before charging to the extraction. I prefer that the rolling be performed in roughened differential rolls, but it may be done using smooth rolls rotating at equal speeds as now used in the crushing of cottonseed meats preparatory to pressing.

It is not necessary, however, that I separate the meats from the hulls and lint prior to the extraction as I can produce an oil of high quality, by my invention, when whole seeds which have been properly cleaned and crushed are extracted, or when properly crushed, cleaned and delinted seeds are used. When the whole seeds are charged to the extractor, the extraction must be of considerably greater volume to produce a given quantity of oil than when meats which have been separated from the hulls and lint constitute the charge to be extracted. Also a somewhat larger quantity of solvent must be used on account of the absorptive qualities of the lint. However, where the crushed whole seed is extracted, the resulting meal is dry and friable, a large portion of it being a powder which will pass through a 100 mesh screen. It is, therefore, much more easily separated from the hulls and lint than are the meats prior to the extraction. Also, the lint associated with the hulls is efficiently degreased during the extraction process, and is cleaner and whiter than is the lint associated with the hulls and removed from the seed kernel before extraction. Also the hulls are more brittle and are thus more easily comminuted after the extraction than they are prior to the extraction. Moreover, when my invention is applied to crushed whole cottonseeds, both the hulls and lint remaining after extraction have no traces of retained solvent. I thus may secure as a by-product of the extraction, a material which as a source of cellulose fiber is superior to the hulls and lint associated with each other as obtained in the usual manner.

Whether the meats charged to the extractor are separated from the hulls and lint before extraction or whether they are charged to the extractor with the hulls and lint as crushed whole seed, they should be subjected to the liquid solvent as soon as possible, after the hulls have been ruptured. Otherwise, the fatty acid content of the oil contained in the meats will increase and the oil will be darker than that which would be secured under the same conditions except that the meats were handled expeditiously between the breaking of the hull and the application of the solvent liquid.

In common with other extraction processes, the meal which I obtain after extraction contains a low content of oil, which, if the extraction has been properly performed, should not exceed 2% by weight of the meal, and which may be reduced to below ½%. With this low oil content, a large part of which is not exposed, the meal secured by my process can be kept for long periods without becoming rancid which cannot be done with the meal prepared from ground press cake. My invention, moreover, provides a meal which is entirely free from solvent, and I do this without applying temperatures to the meal which are injurious to the protein content of the meal. With my invention, solvent is eliminated from the meal at low temperatures which need not be materially above atmospheric temperature, and at the same time the meal is surrounded with solvent vapors which prevent oxidation. The proteins are, therefore, neither converted nor oxidized and the meal is obtained with the proteins unchanged and unbroken as to molecular structure. The meal, therefore, is not subjected to conditions which tend to darken it, when my invention is used. I thus obtain as a product of the extraction a meal of exceptionally light color, being of a straw color as contrasted with a meal varying from dark orange to brown now usually produced. I find that meal as produced according to my invention if exposed to the atmosphere for a protracted period, will become oxidized on the surface and will assume a light pink or lavender cast. This oxidation is largely confined to the surface and does not extend into the mass for an appreciable depth.

My invention thus provides apparatus for and methods of producing a novel crude cottonseed oil which by simply refining the crude oil with caustic in the usual manner as practiced, will make—

1. Winter white oil.
2. Deodorized winter white oil.
3. Winter yellow oil.
4. Deodorized winter yellow oil.
5. Summer white oil.
6. Summer yellow oil.
7. Deodorized summer white oil.
8. Deodorized summer yellow oil.
9. White salad oil.
10. Yellow salad oil.

and any of the above tabulated oil may be bleached with the addition of 6% of fuller's earth, and produce a water white oil lighter than 10 yellow, 1.5 red. Moreover, I secure by-products having unusual properties.

The objects of my invention are then to secure cottonseed products having these unusual properties and to provide means for producing these crude cotton seed products of unusual properties. Other objects will be apparent from these specifications.

I prefer that my invention be carried out in a continuous extractor of the type described and claimed in my copending application, entitled "Oil treating process" S. N. 738,399 now Patent No. 2,152,664 and filed coincidentally with this application; or in a batch type of extractor of a type described and claimed in my copending application entitled "Oil extraction" S. N. 738,400 now Patent No. 2,152,665 and also filed coincidentally with this application.

Furthermore where the "winter" oil is one of the products desired, I prefer that the method of separation be adopted as described, broadly claiming the separation of oils into fractions having different melting points in my copending application entitled "Separation of oils" S. N. 738,401 now Patent No. 2,152,666 and also filed coincidentally with this application. However, I do not limit myself to the particular form shown.

My invention will now be described in further detail in connection with the accompanying drawings which are a part of these specifications.

In these drawings, Figure 1 is a diagrammatic layout illustrating continuous extraction in which a plurality of solutions of different characteristics are withdrawn and continuously treated for separation of the solvent from the extract.

Figure 2 is a modification utilizing a batch extractor.

Figure 4:
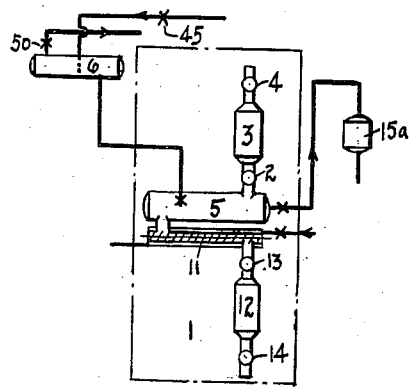
Figure 4 is a modification of Figure 1 to utilize a continuous extractor from which only a single solution can be continuously withdrawn.

Referring to Figure 1, 1 is an extractor into which the cottonseed meats to be extracted is fed through rotary valve 2 from the feed compartment 3 which is sealed to the atmosphere by the rotary valve 4. The extractor 1 has three extraction compartments 5a, 5b and 5c into which solvent is delivered from the tanks 6a, 6b and 6c respectively through the solvent feed valves 7a, 7b and 7c respectively. The meats delivered through the rotary valve 2 are passed to the conveyor 8 where they may be brought to proper temperatures. The conveyor 8 delivers the meats to the upper extraction cylinder 5a where they are extracted with the solvent from the tank 6a in the manner described in detail in my co-pending application of even date relating to "Oil treating process" and "Separation of oils." After extraction in this cylinder, they pass through rotary valve 9 to the cylinder 5b where they are extracted with the solvent from the solvent tank 6b. They are then passed through rotary valve 10 to the cylinder 5c where they are extracted with the solvent from the storage tank 6c. They are then passed to the heated conveyor 11 in which solvent retained in the spent meal is evaporated. The meal is then delivered to the outlet compartment 12 which is sealed on either end by the rotary valves 13 and 14.

The solution from extractor compartment 5a is removed through valve 16a to the equalizing tank 15a. Similarly the solution from compartment 5b is removed through valve 16b to equalizing tank 15b. Likewise the solution from cylinder 5c is delivered to tank 15c through valve 16c.

The arrangement shown in Figure 1 is specially adaptable to the simultaneous production of several qualities of crude cottonseed oil, one of which upon refining will be a "wintered" grade. The temperatures are preferably maintained within the extraction cylinder 5a, below −5° F. and the meats entering the cylinder through the conveyor 8 are preferably cooled to a temperature approaching this prior to their delivery to cylinder 5a. Where solid stearine is desired from the solution contained in cylinder 5c, the temperatures maintained in the cylinder 5b should preferably be below 60° F., while the temperature maintained in cylinder 5c should be above 80° F.

The method of treating the solution obtained from cylinder 5a is shown above the dot and dash line AA. The method of treating the solution from the cylinder 5b is shown above the dot and dash line BB and below the line AA. The method of treating the solution from cylinder 5c is shown above the dot and dash line CC but below the line BB. As the method of treatment shown in each of these portions is in many respects alike, the construction and operation of only one of these portions will be explained in detail. However, attention will be called to the principal variations in the treatment of the three solutions as shown in the figure.

The solution from tank 15a is delivered to the filter 17a by means of the pump 18a. In the filter, the fine suspended particles are removed and the clear solution is delivered to the heat exchanger 19a and the still 20a either through valve 21a or through the settling tank 22a and filtering means 23a, with valve 21a closed and only 42a and 43a open, the operation of which will be more fully explained later.

Still 20a is operated in direct communication and at substantially the same pressure as condenser 24 wherein the vapors distilled from the solution in the still 20a are condensed and delivered to the solvent tank 25. I prefer that the temperatures maintained within the still shall not exceed 210° F. and shall preferably be below 200° F. With either propane or butane as solvents, the treatment of the solution in still 20a should remove from the solution the major portion of the solvent which may be condensed directly in condenser 24 without compressing the solvent vapor.

The solution withdrawn from still 20a through valve 26a should contain 10% or less solvent when either propane or butane is used. The solution withdrawn from the still 20a is delivered to the still 27a, the vapor space of which is in communication with the exhaustor 28 which maintains the pressure within the still 27a at a value preferably slightly above that of the atmosphere, but below the pressure of condenser 24. The vapors withdrawn from still 27a by the exhaustor 28 are compressed and delivered to condenser 24 where they return to the liquid state along with the vapor from still 20a. Like still 20a, the temperature in still 27a is maintained below 210° F. and is preferably 200° F.

The solvent in the solution should be reduced to an amount less than 2% by the treatment within still 27a, and this solution is withdrawn from the still through valve 29a to the still 30a where its temperature is maintained at substantially that maintained in still 20a and 27a but where the solution is subjected to treatment with vacuum and/or open steam as described in detail in my co-pending applications referred to hereinbefore. The vapor space in still 30a is in communication with the condenser 31 in which water vapor will be condensed if open steam is used. The vacuum may be maintained in the still 30a, and the condenser 31 by removing the solvent vapors using exhaustor 32 which compresses the vapor and delivers them to the condenser 33.

The condensed liquid from 33 is delivered to the separating tank 34 from which water may be removed from the bottom through valve 35 and solvent liquid may be removed from the upper portion through pipe 36 and delivered to the solvent tank 25. Proper treatment within the still 30a should produce an extract entirely free from solvent and where sufficient open steam is used, the extract withdrawn from the still will be a deodorized oil.

The cottonseed oil contains a number of impurities which impart to it the characteristic taste of cottonseed oil. These impurities are volatile but difficultly so. It is the usual practice to deodorize the cottonseed oil for edible purposes by treating the oil after it is refined. This treatment consists in passing superheated steam through the refined oil maintained at temperatures which if applied in the same manner to the crude oil would so deteriorate it that it would make a much darker oil on refining than were it not so treated. In many cases crude oil which would refine into a prime yellow oil, would fail to make a prime oil if heated to the degree necessary for the usual deodorizing process, but this same oil when refined can be deodorized without substantial degradation. These natural volatile constituents of the cottonseed oil are more difficult to volatilize than the solvent which I use. If the distillation is stopped when the solvent is removed, these constituents will largely remain with the oil. However, if in the distillation, I apply vacuum so that low temperatures (below 210° F.) can be maintained in the still and not condense open steam, I find that the distillation can be continued and sufficient open steam can be applied, so that the crude oil as produced in my process can be effectively deodorized without materially degenerating the oil produced. In this way, I secure a deodorized crude cottonseed oil, which so far as I am aware is a new composition of matter.

The oil is withdrawn from the still 30a through the valve 37a by any suitable means such as the pump 38a which delivers it to the filter 39a where any suspended matter which may have been precipitated from the solution is removed and the clear solution is delivered through the oil cooler 40a to the oil storage tank 41a. With some seeds, little or no solid matter is precipitated during the process of solvent removal. Therefore filtering means 39a may be omitted where the oil withdrawn from still 30a is clear and brilliant. The solvent from tank 25 is withdrawn by any suitable means such as the pump 44 which delivers it consecutively through heat exchangers 19c, 19b and 19a. Part of the solvent after passing through heat exchangers 19c is withdrawn through valve 45c to solvent storage tank 6c. Further portion is withdrawn after the solution passes through heat exchanger 19b and is returned through valve 45b to the solvent tank 6b. A further portion after passing through heat exchangers 19a is delivered through valve 45a to the tank 6a.

Where "wintered" oil is desired and the extractor 1 has not been operated in a manner whereby such an oil is obtained directly upon removing the solvent from the solution withdrawn from the extractor, proper treatment of the solution prior to the separation of the solvent from the extract, will produce such an oil. This is accomplished by means of the settling tank 22a and filter 23a. In this event valve 21a is closed and valves 42a and 43a are open. The temperature within settling tank 22a is maintained at a value whereby the high melting point fraction of the oil will be precipitated as a solid solution with the solvent. Preferably, the temperature within tank 22a should be such that not only will all of the high melting point fraction be precipitated but that small portions of the higher melting point components of the "wintered" fraction are also precipitated. The reduced temperatures may be maintained in tank 22a by permitting a portion of the solvent to evaporate and be withdrawn through valve 44a to the suction of the exhaustor 28. The liquid solution is separated from the precipitate in the settling tank either by decanting or filtering and is delivered through heat exchanger 19 to the still 20 where it is treated in a manner hereinbefore described. The precipitate from tank 22a may be withdrawn by any suitable means such as the pump 46a and delivered through the heat exchangers 47b to the settling tank 22b. Additional solvent may be added to the precipitate through either valve 48b or 48b'. No further treatment other than that previously described need be provided for the production of a "wintered" oil. If one of the products desired is a firm stearine and/or "summer oil," further separation of the residue is required. This further treatment will now be described.

The solution in 22b is maintained at a temperature sufficiently reduced that the stearine contained will be precipitated therefrom, but at the same time, sufficiently high that all of the components belonging in the "winter" oil will remain in the liquid solution.

Where the concentration of the solution in 22b is the same as the concentration of the solution in 22a, this temperature should be somewhat in excess of that maintained in 22a and where the concentration of the solution in 22b is in excess of that in 22a, a still higher temperature should be maintained in 22b. The liquid solution is separated from the precipitate and part of the liquid is returned through heat exchanger 47b to the tank 22a where it is treated along with the solution entering from the extractor 1. The remainder of the liquid from 22b may be delivered through valve 49 through heat exchanger 19b to the still 20b wherein it is treated in the same manner as described for the solution entering still 20a. The precipitate from 22b is delivered through the heat exchanger 47c to the settling tank 22c. Additional solvent may be added to this precipitate at any convenient point such as through valve 48c or 48c'.

The solvent in tank 22c is maintained at a temperature such that the major portion of the stearine will be precipitated but such that a portion of the lower melting point component of the stearine will remain in the liquid solution. This insures a fine stearine product. The liquid is separated from the precipitate and is returned through the heat exchanger 47c to the precipitating tank 22b. The precipitate from 22c is delivered through the heat exchanger 19c to the still 20c from which point treatment is similar to that previously described in connection with the solution entering still 20a.

The proper temperatures may be maintained in the solvent in tanks 6a, 6b and 6c by any suitable means. Where reduced temperatures are maintained, this may be accomplished by evaporating the solvent vapors. Thus by opening valve 50a, vapor is withdrawn from tank 6a and delivered to the suction of exhaustor 28. Proper temperatures can similarly be maintained within the extractor compartment 5a by opening valve 51. Solvent vapors are then withdrawn from compartment 5a through the meats about to be delivered to the compartment by the conveyor 8 and these vapors are recovered by means of the exhaustor 28 and the condenser 24. In this manner the temperature of the solution in the extraction compartment 5a may be maintained to any desired reduced value and at the same time the meats will be cooled to substantially the same temperature as that obtaining in the extraction compartment, before they are delivered to the extraction compartment.

Where the solution is obtained in a single compartment extractor such as that illustrated in Figure 4, the single solution so obtained may be fractionated into components of different melting points through the use of settling tanks prior to the separation of the solution from the extract in the manner just described. In this case, the solution from the extractor enters the separation system only through the tank 15a in a manner which is equivalent to closing valves 16b, 16c and 7b and 7c of Figure 1.

The removal of meal from the extractor and the separation of solvent from the meal, will now be described. The meal within the extractor chamber is delivered to a cylinder where it is out of contact with the solvent. Here most of the adhering solvent is drained from the meal and the meal is then discharged to the heated conveyor 11, where heat is applied to the meal in its passage through the conveyor. While the amount of heat must be sufficient to provide all the latent heat of evaporation of the solvent associated with the meal and to slightly heat the meal and to superheat the solvent vapors, it may be supplied at relatively low temperatures and it should be so controlled that the meal experiences only a slight rise in temperature in passing through the conveyor. I prefer that the meal be discharged by the conveyor at a temperature not exceeding 130° F. The meal so discharged is delivered into the sealed discharge chamber 12 through the rotary valve 11. Associated with the meal delivered by the rotary valve 11 will be an amount of solvent vapors to fill the voids in the meal. I prefer that these be withdrawn by maintaining a vacuum within the sealed chamber 12, by any suitable means.

Now referring to Figure 2 which is a modification of Figure 1 suitable for the use of batch extraction rather than continuous extraction as illustrated in Figure 1. In this figure, the extraction process, which is carried on in a simultaneous manner in Figure 1, may be consecutively accomplished. The extractor 1 is charged with meal through the inlet 3. It is then securely sealed to the atmosphere. Air is withdrawn from the interior of the extractor by means of the exhaustor 52 through the valve 53. When sufficient vacuum has been attained within the extraction, valve 53 is closed and solvent vapors are admitted to the extractor through valve 54a from tank 6a which will equalize the pressure between the interior of the extractor and the solvent tank. Prior to admitting the liquid solvent to the extractor, the meats may be cooled by opening the valve 51 which permits the vapors entering the bottom of the extractor through valve 54 to pass through the charge of meats in the extractor and be delivered to the exhaustor 28. Valve 54a and valve 51 are then closed and valve 7a is opened, admitting liquid solvent to the extractor. The extractor is filled with liquid solvent and the charge of meats is allowed to remain in contact with the solvent. The extraction may be conducted in either of two manners. The extractor may be kept full of solvent, valve 7a being maintained in the open position and solution withdrawn from the extractor to tank 15a by opening valve 16a a predetermined amount until sufficient solvent has been admitted to the extractor when valve 7a is closed and the extractor allowed to drain. Or after the extractor is charged with solvent, valve 7a may be closed, the solvent allowed to remain within the extractor for a predetermined time and the solution then withdrawn through valve 16a before charging fresh solution to the extractor.

When the extraction has been completed with solvent from the tank 6a, solvent from the tank 6b may be admitted to the extractor through the valve 7b and the solution later withdrawn through the valve 16b to the tank 15b. In a similar manner, solvent from the tank 6c may be delivered to the extractor through valve 7c and the solution withdrawn through the valve 16c to the tank 15c. The separation of the various solutions delivered to the tanks 15a, 15b and 15c may be effected in the manner hereinbefore described in connection with Figure 1 in which the three solutions were simultaneously obtained from the extractor or as an alternate modification, a single solution may be obtained in tank 15a and subsequent operations carried on in the same manner as described in connection with the extractor shown in Figure 4 as applied to Figure 1.

After the extraction has been completed and the solution drained from the extractor, the solvent remaining with the meal may be removed by opening valves 55, 56 and 57 which permits superheated solvent vapors at the pressure of the condenser 24 to be circulated by means of the blower 58 through the heat exchanger 59 into the extractor from below the bed of meal and to be withdrawn above the bed of meal. The superheated vapors thus circulated vaporize the liquid solvent associated with the meal and the excess vapors so produced are returned to condenser 24 through valve 56. When the solvent associated with the meal has been completely evaporated, as can be determined by a rise in temperature of the vapors issuing from the extractor valves 55, 56 and 57 are closed and valve 51 is opened. The pressure within the extractor is thereby reduced to approximately that maintained by the exhaustor 28 with the withdrawal of a portion of the vapor from the extractor. Valve 51 is then closed and valve 60 is opened, whereby the extractor is connected to the suction of exhaustor 32 by which further vapors are withdrawn from the extractor and a vacuum is created within the extractor. Valve 60 is then closed and valve 61 is opened which allows air to enter the bottom of the extractor and breaks the vacuum within the extractor. The outlet 12 may then be opened and the spent meal discharged from the extractor.

Figure 3:
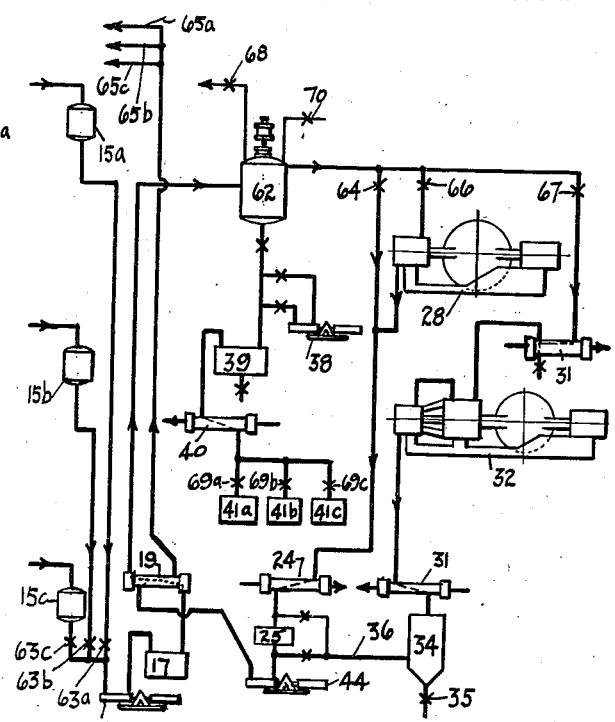
Figure 3 is a modification of solvent removal step applicable to the extractor shown in Figure 2 and in which the solvent is removed from the extract in batches.

Figure 3 is a modification of that portion of Figure 1 that deals with the separation of the solvent from the extract. Still 62 is equivalent to stills 20, 27 and 30 of Figure 1 and the functions which are carried on consecutively on any single portion of solution but simultaneously on different portions of the solution in the stills 20, 27 and 30 of Figure 1 are carried on entirely consecutively within the still 62. Thus referring to Figure 3 and considering the solution in tank 15a, this solution is delivered through valve 63a to the pump 18 through filtering means 17 and the heat exchanger 19 to the still 62. Here solvent is removed from the solution, the first operation being with the vapors withdrawn through valve 64 through the condenser 24, the condensate collecting in the tank 25 and being withdrawn therefrom by the pump 44 and returned through the heat exchanger 19 through pipe 65a to the tank 6a. After the solution has been distilled under these conditions, until substantially no more solvent is withdrawn, valve 64 is closed and valve 66 is opened which allows the distillation to be carried on at the pressure produced by the exhaustor 28. The vapors withdrawn by exhaustor 28 are compressed and delivered to the condenser 24 from which they are handled in a manner just described. When the distillation at this pressure has been completed, valve 66 is closed and valve 67 is opened which allows the still 62 to perform the same functions as are performed in Figure 1 by the still 30. After this operation is completed, the extract may be withdrawn from the still 62 by any suitable means such as by the pump 38, or valve 70 may be opened admitting air to the interior of the still and the still is thereby brought to atmospheric pressure. The oil contained therein can then be drained by gravity through the filter 39, the oil cooler 40 and the valve 69a to the oil storage tank 41a which completes the operation on the batch of oil charged to the still 62 from the tank 15a. Similar operations may then be performed on the solution from the tank 15b except in this case, the solvent will be returned to tank 6b through the pipe 65b and the finished oil will be delivered to oil storage tank 41b through the valve 69b. Similar operations may then be conducted on the solution from the tank 15c. I would prefer that prior to admitting the solution either from tank 15a, 15b or 15c into the still 62 that the still be evacuated and vacuum produced within the still by opening valve 68 which connects the interior of the still with the exhaustor 52 (see Figure 2). In this manner air which may be contained within the still is removed from the system and diminishes the frequency that the various condenser will become air bound. Where the finished oil is removed by drawing it from the still with a pump rather than by equalizing the pressure within the still to that of the atmosphere, the connection with valve 68 is unnecessary.

Many changes may be made in the details without departing from the spirit of my invention and I do not limit my invention to the particular construction shown.

Having fully described my invention so that it may be readily understood by one skilled in the art, I claim:

1. The method of extracting from cottonseeds which comprises subjecting cottonseed meats to a hydrocarbon solvent, gaseous at ordinary temperature and pressure, maintaining the solvent in the liquid phase while in contact with the material to be extracted, withdrawing the solution, passing the solution through a filter press, substantially completely removing the solvent from the solution by vaporizing the solvent at temperatures not exceeding a temperature in the order of 210° F. to separate the solvent from the extract whereby there is separated a crude cottonseed oil of a high quality, the final removal of solvent being done under a vacuum, and the initial removal of solvent being done at a pressure substantially in excess of the pressure at which the solvent is contacted with the cottonseed meats.

2. The method of extracting from cottonseeds which comprises subjecting cottonseed meats to a hydrocarbon solvent, gaseous at ordinary temperature and pressure maintaining the solvent in the liquid phase at a temperature below approximately −5° F. while in contact with the material to be extracted, withdrawing the solution, passing the solution through a filter press, substantially completely removing the solvent from the solution by vaporizing the solvent at temperatures not exceeding a temperature in the order of 210° F. to separate the solvent from the extract.

3. The method of extracting from cottonseeds which comprises subjecting cottonseed meats to a hydrocarbon, solvent gaseous at ordinary temperatures and pressures, maintaining the solvent in the liquid phase at a temperature below approximately −5° F. while in contact with the material to be extracted, withdrawing the solution, passing the solution through a filter press, substantially completely removing the solvent from the solution by vaporizing the solvent at temperatures not exceeding the order of 210° F. with the aid of steam injected thereinto and vacuum to separate the solvent from the extract.

4. The method of extracting from cottonseeds which comprises subjecting cottonseed meats to a normally gaseous hydrocarbon solvent, maintaining the solvent in the liquid phase at a temperature below the order of −5° F. while in contact with the material to be extracted, withdrawing the solution, subjecting the partially extracted meats to additional solvent while maintaining the solvent in the liquid phase at a temperature approximately of the order of 80° F., withdrawing the second solution, separately vaporizing the solvent from the extract in both solutions.

5. The method of extracting from cottonseeds which comprises cooling cotton seed meats to a temperature of approximately −5° F. then subjecting the cooled meats to a normally gaseous hydrocarbon solvent, maintaining the solvent in the liquid phase at a temperature below approximately −5° F. while in contact with the material to be extracted, withdrawing the solution, vaporizing the solvent to separate it from the extract.

6. The method of extracting from cottonseeds which comprises subjecting cottonseed meats to a normally gaseous hydrocarbon solvent maintained in the liquid phase and at a temperature of the order of −5° F. while in contact with the material to be extracted, withdrawing the solution, maintaining the solution to a temperature below approximately −5° F., separating the solid material thus formed from the liquid solution, vaporizing the solvent from the liquid solution to separate it from the extract.

7. In a method of extracting cottonseed, the step of cooling the meats to a temperature of 30° F. or lower and then subjecting the meats to a liquid solvent, in the manner defined in claim 6.

8. In the method of extracting cottonseed, the steps which comprise subjecting the meats to a liquid solvent, said solvent being applied to the meats separately and withdrawn therefrom in solution at a plurality of progressively increasing temperatures, the first being between −16° F. and −5° F.

9. In the method of extracting cottonseed, the steps which comprise subjecting the meats to a liquid solvent, withdrawing the solution, and subjecting said solution to a plurality of increasing temperature stages with separation of the solution at each stage, whereby there is produced a plurality of solutions each containing different melting point fractions of the cottonseed oil, the first temperature stage being of the order of −15° F. and −5° F.

10. In the method of extracting cottonseeds, the steps which comprise subjecting the meats to a liquid solvent, withdrawing the solution, and subjecting said solution to a plurality of increasing temperature stages, the first being of the order of −15° F. to −5° F., with separation of the solution at each stage and with feeding of solution from one stage back into a preceding stage.

11. As a new composition of matter, a crude cottonseed oil characterized by the property that it is deodorized and that when it is subjected to usual refining treatment with caustic, it will produce a cooking oil of prime color or lighter fit for human consumption.

12. As a new composition of matter, a crude cottonseed oil characterized by the property that when it is subjected to usual refining treatment with caustic, it will produce a "white" grade cottonseed oil, with no other further treatment.

13. As a new composition of matter, a crude cottonseed oil characterized by the property that when it is subjected to usual refining treatment with caustic it will produce a "deodorized winter" oil (or salad oil) suitable for mayonnaise purposes with no further treatment.

14. As a new composition of matter, a crude cottonseed oil characterized by the property that when it is subjected to usual refining treatment with caustic, and the refined oil so produced is subjected to the usual bleaching treatment with 6% fuller's earth, the bleached oil will be "water white" and will show a color as measured on the Lovibond scale of 10 yellow 1.1 red or lighter.

15. As a new composition of matter, a crude cottonseed oil characterized by the property that when it is subjected to usual refining treatment with caustic, will produce a deodorized "winter white" oil or white salad oil with no further treatment.

16. The method of extracting from cottonseed which comprises subjecting cottonseed meats to a hydrocarbon solvent, gaseous at ordinary temperature; maintaining the solvent in the liquid phase at a temperature of approximately −5° F. while in contact with the material to be extracted; withdrawing the solution, passing the solution through a filter press, substantially completely removing solvent from the solution by vaporizing the solvent while maintaining the solution below a temperature of the order of 210° F. in a plurality of stages at successively decreasing pressures to separate the solvent from the extract; the pressure in the initial distillation step being maintained at a value in excess of the vapor pressure of the solvent at extraction temperature; and the pressure in the final distillation step being maintained at a high vacuum.

HENRY ROSENTHAL.